United States Patent
Ling et al.

(10) Patent No.: US 12,256,206 B2
(45) Date of Patent: Mar. 18, 2025

(54) DIAPHRAGM FOR SOUND PRODUCING DEVICE, SOUND PRODUCING DEVICE, AND METHOD FOR ASSEMBLING THE SAME

(71) Applicant: GOERTEK INC., Shandong (CN)

(72) Inventors: Fengguang Ling, Shandong (CN); Shuqiang Wang, Shandong (CN); Chun Li, Shandong (CN); Chunfa Liu, Shandong (CN)

(73) Assignee: GOERTEK INC., Shandong (CN)

( * ) Notice: Subject to any disclaimer, the term of this patent is extended or adjusted under 35 U.S.C. 154(b) by 775 days.

(21) Appl. No.: 17/631,015

(22) PCT Filed: Dec. 14, 2018

(86) PCT No.: PCT/CN2018/121123
§ 371 (c)(1),
(2) Date: Aug. 5, 2022

(87) PCT Pub. No.: WO2020/037899
PCT Pub. Date: Feb. 27, 2020

(65) Prior Publication Data
US 2023/0262394 A1    Aug. 17, 2023

(30) Foreign Application Priority Data
Aug. 20, 2018   (CN) .......................... 201810948780.0

(51) Int. Cl.
*H04R 7/04* (2006.01)
*C08K 5/00* (2006.01)
(Continued)

(52) U.S. Cl.
CPC ............. *H04R 7/04* (2013.01); *C08K 5/0025* (2013.01); *C08L 23/0869* (2013.01);
(Continued)

(58) Field of Classification Search
CPC .. H04R 7/04; H04R 31/003; H04R 2207/021; H04R 2231/001
See application file for complete search history.

(56) References Cited

U.S. PATENT DOCUMENTS

2017/0078799 A1   3/2017 Little

FOREIGN PATENT DOCUMENTS

| CN | 105933831 A | 9/2016 |
| CN | 106060721 A | 10/2016 |

(Continued)

OTHER PUBLICATIONS

International Search Report dated Apr. 29, 2019 issued in PCT/CN2018/121123.

*Primary Examiner* — Sunita Joshi
(74) *Attorney, Agent, or Firm* — Scully, Scott, Murphy & Presser, P.C.

(57) ABSTRACT

A diaphragm applied to a sound producing device, a sound producing device, and a method for assembling the same. The diaphragm comprises a film layer prepared by means of a crosslinking reaction of at least one of an ethylene-acrylate copolymer and an ethylene-acrylate-carboxylic acid copolymer. The molecular structure of the diaphragm comprises a vinyl-acrylic group. The group causes the material to have a less symmetrical chemical structure, a reduced tacticity and an increased steric hindrance, such that the diaphragm has a high loss factor, and the sound producing device achieves a good damping effect.

17 Claims, 1 Drawing Sheet

(51) Int. Cl.
*C08L 23/08* (2006.01)
*C08L 23/0869* (2025.01)
*H04R 31/00* (2006.01)

(52) U.S. Cl.
CPC ........ *H04R 31/003* (2013.01); *C08L 2203/20* (2013.01); *C08L 2312/00* (2013.01); *H04R 2207/021* (2013.01); *H04R 2231/001* (2013.01)

(56) References Cited

FOREIGN PATENT DOCUMENTS

| | | | |
|---|---|---|---|
| CN | 106465015 | A | 2/2017 |
| CN | 206024094 | U | 3/2017 |
| CN | 106792377 | A | 5/2017 |
| CN | 106817658 | A | 6/2017 |
| CN | 107211217 | A | 9/2017 |
| CN | 108243371 | A | 7/2018 |
| JP | 6131015 | B2 * | 5/2017 |

* cited by examiner

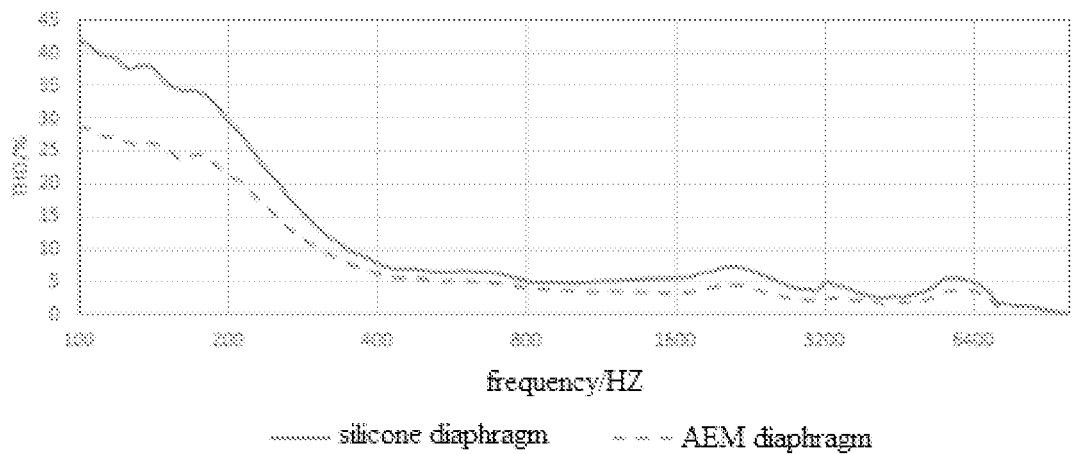

DIAPHRAGM FOR SOUND PRODUCING DEVICE, SOUND PRODUCING DEVICE, AND METHOD FOR ASSEMBLING THE SAME

This is a national stage application filed under 37 U.S.C. 371 based on International Patent Application No. PCT/CN2018/121123, filed Dec. 14, 2018, which claims priority to Chinese Patent Application No. 201810948780.0 filed Aug. 20, 2018, the disclosures of both of which are incorporated herein by reference in their entirety.

TECHNICAL FIELD

The present invention relates to the technical field of electro-acoustic conversion, and more specifically, to a diaphragm for a sound producing device, a sound producing device and a method for assembling the sound producing device.

BACKGROUND

The diaphragms for sound producing devices mostly employ multi-layer composite materials, for example, two-layer, three-layer or more-layer strip-shaped materials which are compounded from engineering plastics such as PEEK, PAR, PEI, PI and the like, elastomer materials such as TPU, TPEE and the like, glue films such as acrylic glue film, silicone glue film and the like through a reasonable combination, to meet the requirements of sound producing devices with different performances. In addition, since silicone rubber has good thermal stability, good hydrophobic properties and excellent resilience performance, it is also used to make diaphragms.

However, the above materials have their own shortcomings. For example, engineering plastics such as PEEK, PAR and the like have good temperature resistance, but have poor material resilience, and the product made of it is prone to causing film folds and cannot have a waterproof function. Elastomer materials such as TPU, TPEE and the like have low melting points and poor temperature resistance. Although the silicone rubber material has good thermal stability and good resilience, due to its symmetrical chemical structure, high tacticity, and low steric hindrance of the symmetrically substituted methyl group, the material has low damping characteristics, resulting in a significant distortion in performance of the product of the silicone rubber diaphragm.

SUMMARY

An object of the present invention is to provide a new technical solution for a diaphragm for a sound producing device.

According to a first aspect of the present invention, a diaphragm for a sound producing device is provided. The diaphragm may include a film layer prepared by a cross-linking reaction of at least one of an ethylene-acrylate copolymer and an ethylene-acrylate-carboxylic acid copolymer.

Optionally, the film layer is an amide crosslinked polymer and/or an imide crosslinked polymer formed by a reaction of the ethylene-acrylate-carboxylic acid copolymer with an amine crosslinking agent.

Optionally, the diaphragm may further include an inorganic filler reinforcing agent added to at least one of the ethylene-acrylate copolymer and the ethylene-acrylate-carboxylic acid copolymer.

Optionally, the inorganic filler reinforcing agent may include at least one of carbon black, fumed silica, precipitated calcium carbonate and barium sulfate.

Optionally, the ethylene-acrylate-carboxylic acid copolymer is represented by the following chemical formula:

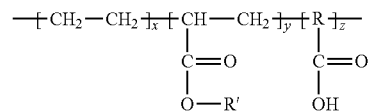

wherein x, y, and z are natural numbers; R and R are alkyl groups.

Optionally, the ethylene-acrylate copolymer is represented by the following chemical formula:

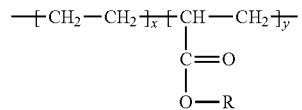

wherein x and y are natural numbers; R is an alkyl group.

Optionally, the amine crosslinking agent may include at least one of hexamethylene diamine, hexamethylene diamine carbamate, triethylene tetramine, methylene diphenylamine and di-o-tolylguanidine.

Optionally, the crosslinking agent of the ethylene-acrylate copolymer may include a peroxide crosslinking agent for causing the ethylene-acrylate copolymer to generate free radicals, and a coagent for free radical polymerization with the ethylene-acrylate copolymer.

Optionally, the peroxide crosslinking agent may include at least one of 1,3-1,4-bis(tert-butylperoxyisopropyl)benzene, dicumyl peroxide, 2, 5-dimethyl-2,5-bis(tert-butylperoxy)hexane, tert-butyl cumyl peroxide, 2,5-dimethyl-2,5-bis(tert-butylperoxy)-3-hexyne, 4,4'-bis(tert-butylperoxy) n-butyl valerate, 1,1'-bis(tert-butylperoxy)-3,3,5-trimethylcyclohexane and 2,4-dichlorobenzoyl peroxide.

Optionally, the coagent may include at least one of trimethylolpropane triacrylate, trimethylolpropane trimethacrylate, N,N'-m-phenylene bismaleimide, diallyl phthalate, triallyl isocyanate, and triallyl cyanate.

Optionally, the diaphragm has a single-layer structure or is a composite diaphragm, the composite diaphragm include said film layer.

Optionally, the diaphragm has a single-layer structure, and the diaphragm has a thickness ranging from 10 μm to 200 μm.

Optionally, the diaphragm has a thickness ranging from 60 μm to 120 μm.

Optionally, the diaphragm is prepared by compression-injection molding or air-pressure molding.

According to a second aspect of the present invention, a sound producing device is provided. The sound producing device may include a magnetic circuit system and a vibration system that cooperate with each other, and the vibration system may include the diaphragm according to the present invention.

According to a third aspect of the present disclosure, a method for assembling a sound producing device is provided. The method may include: mixing at least one of the ethylene-acrylate copolymer and the ethylene-acrylate-carboxylic acid copolymer with a crosslinking agent to make a diaphragm blank with a predetermined structure, wherein the diaphragm blank has an adhesive property; directly bonding the diaphragm blank to at least one of a voice coil, a shell, a reinforcing layer and a magnetic yoke of the sound producing device; and vulcanizing the diaphragm blank under high temperature conditions to form a fixed connection.

According to an embodiment of the present disclosure, the diaphragm has a molecular structure including a vinyl-acrylic group. The group enables the material to have a less symmetrical chemical structure, a reduced tacticity and an increased steric hindrance, such that the diaphragm has a high loss factor and the sound producing device achieves a good damping effect.

In addition, the molecular chains formed by the binary copolymers and/or terpolymers have strong intermolecular forces, which enables the diaphragm to have a good temperature resistance. In addition, the carboxylic acid monomer groups in the terpolymer can further improve the temperature resistance of the diaphragm, and can provide crosslinking points to form a network-like macromolecular structure.

In addition, the molecular chain formed by the vinyl-acrylic group has good flexibility, which enables the diaphragm to have a good resilience and a good tensile strength.

In addition, the binary copolymer or terpolymer and the crosslinking agent undergo a crosslinking reaction to form a network-like macromolecular structure, such that the formed diaphragm can obtain sufficient hardness. In addition, the bonding strength between the network-like macromolecular structure and the filler is higher, and the strength of the diaphragm can be further enhanced by adding fillers.

In addition, due to the good hardness and resilience, the diaphragm has a low risk of rupture and is not prone to being deformed when subjected to water pressure, which enables the diaphragm to have a good waterproof effect.

Through the following detailed description of exemplary embodiments of the present invention with reference to the accompanying drawings, other features and advantages of the present invention will become clear.

BRIEF DESCRIPTION OF DRAWING

The drawing incorporated in the specification and constituting a part of the specification illustrates the embodiments of the present invention, and is used together with the description to explain the principle of the present invention.

FIG. 1 is a comparison curve of total harmonic distortion (THD) between a diaphragm according to an embodiment of the present invention and a silicone rubber diaphragm.

DETAILED DESCRIPTION

Various exemplary embodiments of the present invention will now be described in detail with reference to the accompanying drawing. It should be noted that unless specifically stated otherwise, the relative arrangement, numerical expressions and numerical values of the parts and steps set forth in these embodiments do not limit the scope of the present disclosure.

The following description of at least one exemplary embodiment is practically only illustrative, and in no way serves as any limitation to the present invention and its application or use.

The techniques, methods and equipment known to those of ordinary skills in the relevant fields may not be discussed in detail, but where appropriate, the techniques, methods and equipment should be regarded as part of the specification.

In all examples shown and discussed herein, any specific value should be interpreted as merely exemplary, rather than as a limitation. Therefore, other examples of the exemplary embodiment may have different values.

It should be noted that similar reference numerals and letters indicate similar items in the following drawing, therefore, once an item is defined in one drawing, it does not need to be further discussed in the subsequent drawings.

According to an embodiment of the present invention, a diaphragm for a sound producing device is provided. The diaphragm includes a film layer prepared by a crosslinking reaction of at least one of an ethylene-acrylate copolymer and an ethylene-acrylate-carboxylic acid copolymer. Optionally, the diaphragm has a single-layer structure or is a composite diaphragm composed of multiple film layers. The composite diaphragm includes the above-described film layer.

Specifically, the copolymer has a linear molecular structure. The ethylene-acrylate copolymer is a binary copolymer, namely, a dimer. The ethylene-acrylate-carboxylic acid copolymer is a terpolymer formed by introducing carboxylic acid monomers on the basis of the above-mentioned binary copolymer, namely, a trimer. In this example, the material formed by reaction of the binary copolymer and/or terpolymer with the crosslinking agent is AEM rubber.

Wherein the ethylene-acrylate copolymer is represented by the following chemical formula:

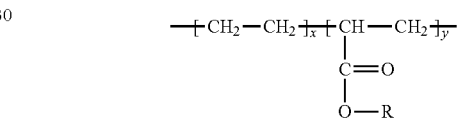

wherein x and y are natural numbers; R is an alkyl group, for example, a group having a structure of $-C_nH_{2n+1}$, such as a methyl group or an ethyl group.

wherein the crosslinking agent of the ethylene-acrylate copolymer includes a peroxide crosslinking agent for causing the ethylene-acrylate copolymer to generate free radicals, and a coagent for free radical polymerization with the ethylene-acrylate copolymer. The crosslinking mechanism is as follows.

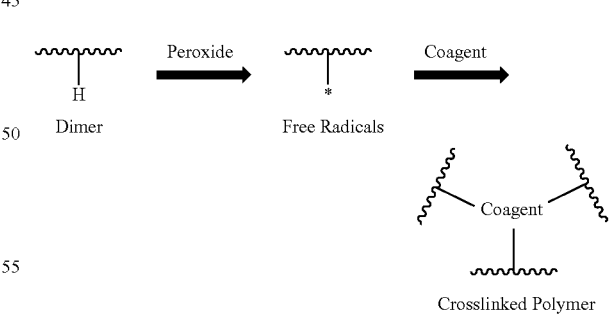

The dimer produces free radicals on the main chain under the action of the peroxide crosslinking agent. The coagent interacts with the free radicals to undergo a crosslinking reaction, such that different dimers are polymerized together through the coagent to form a crosslinked polymer with a network-like structure.

Preferably, the peroxide crosslinking agent includes at least one of 1,3-1,4-bis(tert-butylperoxyisopropyl)benzene (LUPEROX®F), dicumyl peroxide (LUPEROX® DCP), 2,5-dimethyl-2,5-bis(tert-butylperoxy)hexane (LUPEROX® 101), tert-butyl cumyl peroxide (LUPEROX® 801), 2,5-dimethyl-2,5-bis(tert-butylperoxy)-3-hexyne (LUPEROX® 130), 4,4'-bis(tert-butylperoxy) n-butyl valerate (LUPEROX® 230), 1,1'-bis(tert-butylperoxy)-3,3,5-trimethylcyclohexane (LUPEROX® 231) and 2,4-dichlorobenzoyl peroxide (LUPEROX® DCBP).

Preferably, the coagent includes at least one of trimethylolpropane triacrylate (TMPTA), trimethylolpropane trimethacrylate (TMPTMA), N,N'-m-phenylene bismaleimide (HVA-2), diallyl phthalate (DAP), triallyl isocyanate (TAIL), and triallyl cyanate (TAC).

The above-mentioned peroxide crosslinking agent and coagent have a wide range of sources, with which, the crosslinking speed is moderate, and the texture of the diaphragm formed is uniform.

Apparently, the peroxide crosslinking agent and the coagent are not limited to the above-mentioned embodiments, and those skilled in the art can make selections according to practical requirements.

Wherein the ethylene-acrylate-carboxylic acid copolymer can be represented by the following chemical formula:

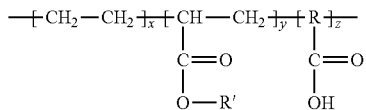

wherein x, y and z are natural numbers; R and R' are alkyl groups, for example, a group having a structure of $-C_nH_{2n+1}$, such as a methyl group or an ethyl group.

Wherein the crosslinking agent of the ethylene-acrylate-carboxylic acid copolymer is an amine crosslinking agent, that is, a substance containing an amino group in the molecule.

An ethylene-acrylate-carboxylic acid copolymer reacts with an amine crosslinking agent to form an amide crosslinked polymer and/or an imide crosslinked polymer. Each of the amide crosslinked polymer and the imide crosslinked polymer has a network-like macromolecular structure. The crosslinking mechanism is as follows:

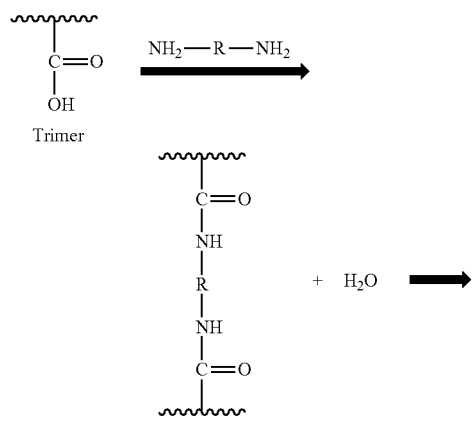

Amide Crosslinked Polymer

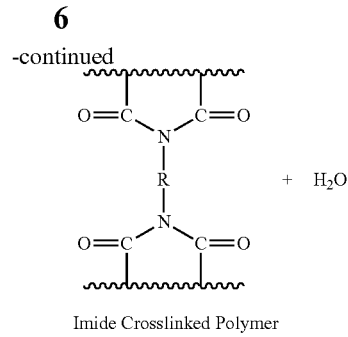

Imide Crosslinked Polymer

In this example, the hydrogen atom in the amino group of the amine crosslinking agent such as $NH_2-R-NH_2$ and the hydroxyl group in the carboxylic acid monomer are condensed by dehydration to form an amide crosslinked polymer. Part of the amide crosslinked polymer is further dehydrated and condensed to form an imide crosslinked polymer. Each of the amide crosslinked polymer and the imide crosslinked polymer has a network-like macromolecular structure.

Preferably, the amine crosslinking agent includes at least one of hexamethylene diamine, hexamethylene diamine carbamate (Diak No. 1), triethylene tetramine, methylene diphenylamine (MDA), di-o-tolylguanidine (DOTG). The above-mentioned amines have a wide range of sources, and the texture of the crosslinked polymer formed by which is uniform.

For example, the above-mentioned dimer is mixed with its corresponding peroxide crosslinking agent and coagent, and the above-mentioned trimer is mixed with its corresponding amine crosslinking agent, and the two mixtures are mixed during the vulcanization molding process to form a blended crosslinked polymer. In this way, it is also possible to form a diaphragm with high strength and high damping characteristics.

Preferably, the percentage of the crosslinking agent in the total mass of the AEM rubber ranges from 0.1% to 20%. The crosslinking agent in this ratio range can achieve a good crosslinking effect, to enable the diaphragm to have a sufficient hardness and resilience performance.

The diaphragm according to the embodiment of the present invention has a molecular structure including a vinyl-acrylic group. The group enables the material to have a less symmetrical chemical structure, a reduced tacticity and an increased steric hindrance, such that the diaphragm has a high loss factor and the sound producing device achieves a good damping effect.

In addition, the molecular chains formed by the binary copolymers and/or terpolymers have strong intermolecular forces, which enables the diaphragm to have a good temperature resistance. In addition, the carboxylic acid monomer groups in the terpolymer can further improve the temperature resistance of the diaphragm, and can provide crosslinking points to form a network-like macromolecular structure. In one example, the short-term withstood temperature of the diaphragm can reach a range from 190° C. to 200° C., and the long-term withstood temperature can reach a range from 170° C. to 180° C., which can meet the requirements of the sound producing device for the temperature resistance of the diaphragm.

In addition, the molecular chain formed by the vinyl-acrylic group has good flexibility, which enables the diaphragm to have a good resilience and a good tensile strength.

In addition, the binary copolymer or terpolymer and the crosslinking agent undergo a crosslinking reaction to form a network-like macromolecular structure, such that the formed diaphragm can obtain sufficient hardness. In addition, the bonding strength between the network-like macromolecular structure and the filler is higher, and the strength of the diaphragm can be further enhanced by adding fillers.

In addition, due to the good hardness and resilience, the diaphragm has a low risk of rupture and is not prone to being deformed when subjected to water pressure, which enables the diaphragm to have a good waterproof effect.

In one example, an inorganic filler reinforcing agent is added to at least one of the ethylene-acrylate copolymer and the ethylene-acrylate-carboxylic acid copolymer. The inorganic filler reinforcing agent can increase the hardness of the diaphragm and play a role of reinforcement.

Optionally, the inorganic filler reinforcing agent includes at least one of carbon black, fumed silica, precipitated calcium carbonate, and barium sulfate. The above-mentioned materials have a wide range of sources, low cost, and are easy to combine with other rubber raw materials. For example, the model of carbon black may be at least one of N550 FEF, N683 APF, N774 SRF-HMAS, N762 SRF-LMNS, ISAF and MT. The above materials are added to the dimer and/or trimer in the form of powder.

Preferably, the percentage of carbon black in the total mass of the raw materials is 20% to 70%. This ratio range enables the diaphragm to have good hardness, tensile strength and resilience performance.

Table 1 shows the performance comparison between the diaphragm formed by the crosslinking reaction of the trimer according to the embodiment of the present invention and the silicone rubber diaphragm, wherein the structures of the two diaphragms are the same.

TABLE 1

| Model | Hardness/ Shore A | Loss factor at condition of 23° C. | Tensile strength/ MPa |
|---|---|---|---|
| The diaphragm according to the present invention | 65 | 0.20 | 17 |
| Silicone rubber diaphragm | 65 | 0.07 | 9 |

It can be seen that the hardness of the diaphragm of the embodiment of the present invention is equivalent to the harness of the silicone rubber diaphragm. However, the loss factor of the diaphragm of the embodiment of the present invention is about 3 times that of the silicone rubber diaphragm, and the tensile strength of the diaphragm of the embodiment of the present invention is about 2 times that of the silicone rubber diaphragm. This shows that, compared with the silicone rubber diaphragm, the diaphragm of the embodiment of the present invention has better damping effect and better tensile strength.

FIG. 1 is a comparison curve of total harmonic distortion (THD) between a diaphragm according to an embodiment of the present invention and a silicone rubber diaphragm. The diaphragm of the embodiment of the present invention is a diaphragm prepared by a crosslinking reaction of a trimer, that is, an AEM diaphragm. The two diaphragms have the same structure and are installed in the same type of loudspeakers.

Wherein the solid line is the THD curve of the silicone rubber diaphragm at different frequencies; the dashed line is the THD curve of the AEM diaphragm at different frequencies.

It can be seen from FIG. 1 that in each of frequency bands, the dashed line is located below the solid line, and the lower the frequency band, the greater the gap between the dotted line and the solid line. This shows that the total harmonic distortion of the loudspeaker with the AEM diaphragm is small, especially in the low frequency band. Therefore, the diaphragm of the embodiment of the present invention can significantly reduce the distortion of the loudspeaker, and enables the loudspeaker to have a good low frequency effect.

In one example, the diaphragm is prepared by compression-injection molding or air-pressure molding.

Wherein in the compression-injection molding, the dimer and its corresponding crosslinking agent and/or the trimer and its corresponding crosslinking agent are injected into the female and male molds, and are molded.

First, a first vulcanization is performed. For example, the temperature of the first vulcanization ranges from 150° C. to 200° C. The above-mentioned raw materials are processed into a diaphragm with a predetermined shape, such as a folding ring-shaped diaphragm or a flat diaphragm. Preferably, the temperature of the first vulcanization is 170° C. and the time is 10 minutes.

Then, the diaphragm formed after the first vulcanization is taken out from the female and male molds, and placed in an oven for a secondary vulcanization. The conditions of the secondary vulcanization include, for example: vulcanizing temperature of 200° C./vulcanizing time of 1 h, vulcanizing temperature of 175° C./vulcanizing time of 4 h, vulcanizing temperature of 150° C./vulcanizing time of 8 h or vulcanizing temperature of 125° C./vulcanizing time of 24 h. The above-mentioned secondary vulcanization conditions make the structure of the diaphragm stable and the molding effect good.

Through two vulcanizations, the conversion rate of the network-like macromolecular structure is higher, the structural strength of the diaphragm is higher, the resilience is better, and the damping performance is better.

Wherein in the air-pressure molding, there is only one mold, i.e., the die head. The die head is configured into a shape corresponding to the structure of the diaphragm. For example, the diaphragm is a folding ring-shaped diaphragm. The die head is flat at each of the parts corresponding to an inner connection part and an outer connection part of the folding ring-shaped diaphragm, and is formed into an annular protrusion with a semicircular cross section at the part corresponding to the folding ring-shaped part.

During production, first, the semi-solid raw material is placed on the die head.

Then, place the die head in a closed cavity. Fill the closed cavity with gas, such as nitrogen and the like, and heat to perform high-temperature and high-pressure molding. The high pressure drives the raw material to be adhered to the die head, and the high temperature can accelerate the vulcanization of the rubber.

Preferably, the heating temperature ranges from 150° C. to 200° C., and the pressure ranges from 0.2 MPa to 1.0 MPa. The diaphragm formed within this temperature range and pressure range has an excellent performance.

Preferably, the diaphragm has a single-layer structure, and has a thickness ranging from 10 μm to 200 μm. For example, the diaphragm is a crosslinked polymer formed by a crosslinking reaction of the dimer and/or the trimer. The diaphragm in this thickness range has good resilience, temperature resistance, damping characteristics and hardness.

Further, the thickness of the diaphragm ranges from 60 μm to 120 μm. The diaphragm in this thickness range is more excellent in resilience, temperature resistance, damping characteristics and hardness.

Preferably, the hardness of the diaphragm ranges from 30 Shore A to 90 Shore A. The diaphragm within this hardness range can meet the $F_0$ (resonant frequency) requirements of different sound producing devices, and those skilled in the art can make selection according to practical requirements.

According to another embodiment of the present invention, a sound producing device is provided. The sound producing device includes a magnetic circuit system and a vibration system that cooperates with the magnetic circuit system to produce sound. The vibration system includes the diaphragm according to the present invention. The diaphragm is connected to one end of a voice coil. The other end of the voice coil is inserted into a magnetic gap of the magnetic circuit system.

The sound producing device has the characteristics of good sound effect, low distortion and good waterproof effect.

According to another embodiment of the present invention, a method for assembling a sound producing device is provided. The method includes the following steps S1, S2 and S3:

S1) mixing at least one of the ethylene-acrylate copolymer and the ethylene-acrylate-carboxylic acid copolymer with a crosslinking agent to make a diaphragm blank with a predetermined structure, wherein the diaphragm blank has an adhesive property. The diaphragm blank refers to a unvulcanized diaphragm, which has the same or similar structure as the diaphragm. The diaphragm blank made of the above-mentioned materials has an adhesive property.

For example, the diaphragm blank includes a central part, an edge part, and a folding ring-shaped part located between the central part and the edge part. The diaphragm blank can be prepared by a mold with a set structure, and can also be prepared by casting, blow molding, etc.

In other examples, the diaphragm blank has a planar structure.

S2) directly bonding the diaphragm blank to at least one of a voice coil, a shell, a reinforcing layer and a magnetic yoke of the sound producing device. The term "directly bonding" refers to relying on the bonding property of the diaphragm blank itself to bond with other parts, rather than bonding with other parts through an adhesive.

For example, the voice coil and/or the reinforcing layer are bonded to the center of the diaphragm blank. The reinforcing layer is used to reduce the split vibration of the formed diaphragm. The shell or the magnetic yoke is bonded to the edge of the diaphragm blank.

S3) vulcanizing the diaphragm blank under a set temperature condition to form a fixed connection. The diaphragm blank is vulcanized under a set temperature condition, such as 150° C. to 200° C., to form the diaphragm and to be connected with other parts.

In this example, since the diaphragm blank itself has an adhesive property, it can be directly arranged to a set position and bonded with other parts before molding. Then, vulcanization is performed. In this way, it can not only ensure the bonding effect and sealing effect of the diaphragm and other parts, improve the waterproof performance of the sound producing device, but also save the steps of assembling the diaphragm and other parts, save the adhesive, and improve the assembly efficiency.

Although some embodiments of the present invention have been described in detail through examples, those skilled in the art should understand that the above examples are only for illustration and not for limiting the scope of the present invention. Those skilled in the art should understand that the above embodiments can be modified without departing from the scope and spirit of the present invention. The scope of the invention is defined by the appended claims.

What is claimed is:

1. A diaphragm for a sound producing device comprising a film layer prepared by a crosslinking reaction of at least one of an ethylene-acrylate copolymer and an ethylene-acrylate-carboxylic acid copolymer and wherein the ethylene-acrylate-carboxylic acid copolymer is represented by the following chemical formula:

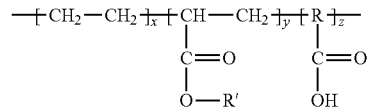

wherein x, y and z are natural numbers; R and R' are alkyl groups.

2. The diaphragm according to claim 1, wherein the film layer is an amide crosslinked polymer and/or an imide crosslinked polymer formed by a reaction of the ethylene-acrylate-carboxylic acid copolymer with an amine crosslinking agent.

3. The diaphragm according to claim 1, further comprising an inorganic filler reinforcing agent added to at least one of the ethylene-acrylate copolymer and the ethylene-acrylate-carboxylic acid copolymer.

4. The diaphragm according to claim 3, wherein the inorganic filler reinforcing agent comprises at least one of carbon black, fumed silica, precipitated calcium carbonate and barium sulfate.

5. The diaphragm according to claim 1, wherein the ethylene-acrylate copolymer is represented by the following chemical formula:

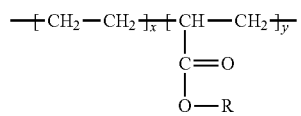

wherein x and y are natural numbers; R is an alkyl group.

6. The diaphragm according to claim 2, wherein the amine crosslinking agent comprises at least one of hexamethylene diamine, hexamethylene diamine carbamate, triethylene tetramine, methylene diphenylamine and di-o-tolylguanidine.

7. The diaphragm according to claim 6, wherein the crosslinking agent of the ethylene-acrylate copolymer comprises a peroxide crosslinking agent for causing the ethylene-acrylate copolymer to generate free radicals, and a coagent for free radical polymerization with the ethylene-acrylate copolymer.

8. The diaphragm according to claim 7, wherein the peroxide crosslinking agent comprises at least one of 1,3-1,4-bis(tert-butylperoxyisopropyl)benzene, dicumyl peroxide, 2, 5-dimethyl-2,5-bis(tert-butylperoxy) hexane, tert-butyl cumyl peroxide, 2,5-dimethyl-2,5-bis(tert-butylperoxy)-3-hexyne, 4,4-bis(tert-butylperoxy) n-butyl valerate, 1,1'-bis(tert-butylperoxy)-3,3,5-trimethylcyclohexane and 2,4-dichlorobenzoyl peroxide.

9. The diaphragm according to claim 7, wherein the coagent comprises at least one of trimethylolpropane triacrylate, trimethylolpropane trimethacrylate, N,N'-m-phenylene bismaleimide, diallyl phthalate, triallyl isocyanate, and triallyl cyanate.

10. The diaphragm according to claim 1, wherein the diaphragm has a single-layer structure or is a composite diaphragm, and the composite diaphragm comprises the film layer.

11. The diaphragm according to claim 1, wherein the diaphragm has a single-layer structure, and the diaphragm has a thickness ranging from 10 μm to 200 μm.

12. The diaphragm according to claim 11, wherein the diaphragm has a thickness ranging from 60 μm to 120 μm.

13. The diaphragm according to claim 1, wherein the diaphragm is prepared by compression-injection molding or air-pressure molding.

14. A sound producing device, comprising a magnetic circuit system and a vibration system that cooperate with each other, wherein the vibration system comprises the diaphragm according to claim 1.

15. A method for assembling a sound producing device, comprising:
mixing at least one of the ethylene-acrylate copolymer and the ethylene-acrylate-carboxylic acid copolymer with a crosslinking agent to make a diaphragm blank with a predetermined structure, wherein the diaphragm blank has an adhesive property;
directly bonding the diaphragm blank to at least one of a voice coil, a shell, a reinforcing layer and a magnetic yoke of the sound producing device; and
vulcanizing the diaphragm blank under high temperature conditions to form a fixed connection.

16. A diaphragm for a sound producing device comprising a film layer prepared by a crosslinking reaction of at least one of an ethylene-acrylate copolymer and an ethylene-acrylate-carboxylic acid copolymer wherein the ethylene-acrylate-carboxylic acid copolymer is represented by the following chemical formula:

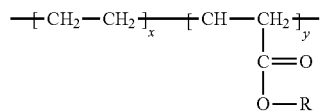

wherein x and y are natural numbers; R is an alkyl group.

17. A diaphragm for a sound producing device comprising a film layer prepared by a crosslinking reaction of at least one of an ethylene-acrylate copolymer and an ethylene-acrylate-carboxylic acid copolymer wherein the ethylene-acrylate-carboxylic acid copolymer is represented by the following chemical formula:

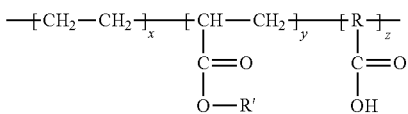

wherein x, y and z are natural numbers; R and R' are alkyl groups, wherein the film layer is an amide crosslinked polymer and/or an imide crosslinked polymer formed by a reaction of the ethylene-acrylate-carboxylic acid copolymer with an amine crosslinking agent; and wherein the amine crosslinking agent comprises at least one of hexamethylene diamine, hexamethylene diamine carbamate, triethylene tetramine, methylene diphenylamine and di-o-tolylguanidine.

* * * * *